United States Patent [19]

Harrison

[11] Patent Number: 5,181,200
[45] Date of Patent: Jan. 19, 1993

[54] HANDOFF METHOD AND APPARATUS FOR MOBILE WIRELESS WORKSTATION

[75] Inventor: Colin G. Harrison, Brookfield, Conn.

[73] Assignee: International Business Machines Corporation

[21] Appl. No.: 605,720

[22] Filed: Oct. 29, 1990

[51] Int. Cl.[5] .................. H04B 7/26; H04L 12/28
[52] U.S. Cl. .................. 370/85.1; 370/95.1; 455/33.2; 455/54.1; 455/54.2; 455/56.1; 340/825.44
[58] Field of Search .......... 370/85.1, 85.2, 85.3, 370/85.4, 85.13, 85.14, 85.15, 94.1, 94.2, 95.1, 95.3; 340/825.44; 455/33, 34, 53, 54, 56, 33.1, 33.2, 34.1, 53.1, 54.1, 54.2, 56.1

[56] References Cited

U.S. PATENT DOCUMENTS

| | | |
|---|---|---|
| 4,402,090 | 8/1983 | Gfeller et al. |
| 4,456,793 | 6/1984 | Baker et al. |
| 4,644,351 | 2/1987 | Zabarsky et al. ........... 340/825.44 |
| 4,789,983 | 12/1988 | Acampora et al. ........... 370/94.1 |
| 4,807,222 | 2/1989 | Amitay . |
| 4,809,257 | 2/1989 | Gatenbein et al. |
| 4,989,204 | 1/1991 | Shimizu et al. ........... 370/94.1 |
| 5,029,183 | 7/1991 | Tymes . |

FOREIGN PATENT DOCUMENTS

169063/23 4/1989 Japan .
WO8807794 10/1988 PCT Int'l Appl. .

OTHER PUBLICATIONS

"Wireless Connection Between a Controller and a Plurality of Terminals" by F. Closs et al. IBM Technical Disclosure Bulletin vol. 20, No. 7 Dec. 1977.
"Infrared Microbroadcasting Network for In-House Data Communication", F. Gfeller IBM Technical Disclosure Bulletin, vol. 24, No. 8, Jan. 1982.

Primary Examiner—Douglas W. Olms
Assistant Examiner—Wellington Chin
Attorney, Agent, or Firm—Perman & Green

[57] ABSTRACT

In response to a data processor (10) breaking a wireless link with a first, original, link adapter (12) a first step deletes the data processor from an active group of the first link adapter and re-directs network datagrams intended for the data processor to a spooler. In response to the data processor subsequently establishing a link with a second, new, link adapter a next step adds the data processor to the active group associated with the second link adapter and transmits stored datagrams in a First In/First Out order from the spooler to the second link adapter for transmission to the data processor. In response to the storage device transmitting all of the stored datagrams to the second link adapter the method includes the further steps of terminating the re-direction of datagrams from the first link adapter to the storage device and, receiving, from the network with the second link adapter, further datagrams addressed to the data processor.

20 Claims, 4 Drawing Sheets

FIG. 5

| STEP | MOBILE UNIT (MU) | ORIGINAL BASE STATION (OBS) | NEW BASE STATION (NBS) |
|---|---|---|---|
| A | LINK BROKEN | DELETE MU FROM ACTIVE GROUP | |
| B | | RE-DIRECT ADDITIONAL DATAGRAMS TO SPOOLER | |
| C | LINK ESTABLISHED | | ADD MU TO ACTIVE GROUP |
| D | PROVIDE OBS ID AND SPOOLER ID | PROVIDE SPOOLER ID | QUERY MU FOR OBS ID AND SPOOLER ID, QUERY OBS FOR SPOOLER ID |
| E | RECEIVE DATAGRAMS | CONTINUE TO RE-DIRECT ADDITIONAL DATAGRAMS TO SPOOLER | QUERY SPOOLER FOR DATAGRAMS, TRANSMIT DATAGRAMS TO MU |

( IF NEW BASE STATION = ORIGINAL BASE STATION )

| STEP | MOBILE UNIT (MU) | ORIGINAL BASE STATION (OBS) | NEW BASE STATION (NBS) |
|---|---|---|---|
| F | | STOP RE-DIRECTING ADDITIONAL DATAGRAMS TO SPOOLER, COMPLETE HANDOFF | SPOOLER EMPTY, COMPLETE HANDOFF BY INFORMING LAN, NEW DATAGRAMS FOR MU DIRECTED TO NBS |

( IF NEW BASE STATION ≠ ORIGINAL BASE STATION )

| STEP | MOBILE UNIT (MU) | ORIGINAL BASE STATION (OBS) | NEW BASE STATION (NBS) |
|---|---|---|---|
| G | | STOP RE-DIRECTING ADDITIONAL DATAGRAMS TO SPOOLER, SEND "SENT LOG", COMPLETE HANDOFF | INFORM BRIDGE(S) OF NEW MU LOCATION. NOTIFY OBS AND RECEIVE "SENT LOG" |

HANDOFF METHOD AND APPARATUS FOR MOBILE WIRELESS WORKSTATION

FIELD OF THE INVENTION

This invention relates generally to data communication systems and, in particular, to a method and apparatus for managing a migration of a mobile data processing unit through a wireless network without loss of network connection.

BACKGROUND OF THE INVENTION

Portable data processing apparatus, such as workstations and other devices, may be connected to a local area network (LAN) via wireless links, which may use infrared or radio signals as a communications medium. The connection of the portable data processor to the LAN is through a base station. The base station is an intelligent device that may appear to the LAN as a bridge, a gateway or a concentrator. There may be multiple mobile units connected by wireless links to a single base station, the base station providing a protocol that enables the mobile units to communicate with the LAN. The mobile units may appear to the LAN to be a subnet or to be part of the same logical LAN. Whatever protocol is employed, a mapping exists for ensuring that network data messages, or datagrams, that are addressed to a mobile unit are routed to the appropriate base station for transmission to the addressed mobile unit. The mapping also ensures that datagrams originating with a particular one of the mobile units are correctly routed into the LAN.

A natural feature of a network of portable wireless devices is that a given portable device will continually visit a series of base stations. One example of a useful application is in a hospital environment wherein medical personnel are in contact with a patient database through a wireless network, which in turn is coupled to a wired LAN through which the database is accessible. Base stations may be ceiling mounted in each patient room for sending and receiving information to a hand-held data processing device carried by the medical personnel. As the medical personnel make their rounds they can be expected to visit a large number of base stations.

This expected pattern of use gives rise to two distinct sets of problems. Firstly, a mechanism is required to inform senders of which base station is currently hosting a moving data processor. Under one known network protocol, TCP/IP by example, an Address Resolution Protocol (ARP) can perform this function.

A second problem relates to providing a mechanism to conceal from a remote sender that the moving workstation has intermittently disconnected from the network. For some protocols, for example those based on NETBIOS sessions, interruption of the session leads to its termination. For TCP/IP, failure to deliver a frame of data results in some number of retries followed by a timeout and disconnection from the network.

In that movement or migration of the mobile data processors between base stations may be a frequent and on-going activity for some wireless network applications it can be appreciated that it is important to provide mechanisms to sustain the illusion of a permanent, if virtual, connection of the workstation to the network. To provide such a mechanism it is important to also provide an efficient and reliable method for a given base station to "hand-off" a moving data processor to another base station without loss of connection from the network and without a loss of data being directed from the network to the mobile data processor.

In U.S. Pat. No. 4,456,793, issued Jun. 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,809,257, issued Feb. 28, 1989 D. Gantenbein, F. Gfeller and E. Mumprecht describe an infrared communication system are assigned to one of a plurality of hierarchical categories.

In commonly assigned U.S. Pat. No. 4,402,090, issued Aug. 30, 1983, F Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In Japanese Publication 89-169063/23 there is described a voice system that stores a recording of a voice message when a mobile station cannot be reached. Subsequently, the mobile station transmits a message recovery code in response to which a base station sends the recorded message.

In International Application WO 88/07794, published Oct. 6, 1988, G. Vacon et al. disclose apparatus and method for coupling two LANs by means of a wireless radiation link.

In IBM Technical Disclosure Bulletin, Vol. 20, No. 7, Dec. 1977 F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, Jan. 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

It is thus an object of the invention to provide method and apparatus for providing a continual connection of a migrating data processor to a network employing a wireless link.

SUMMARY OF THE INVENTION

The foregoing and other problems are overcome and the object of the invention is realized by a method, and apparatus for accomplishing the method, that provides a continual connection of a data processor to a wired network. The network is of the type that has a plurality of base stations, or wireless link adapters, each of which directs datagrams from the network over a wireless link to data processors within an associated active group. A given one of the data processors is enabled, at any given time, to be a member of an active group associated with only one link adapter.

In response to the data processor breaking the wireless link with a first, original, link adapter a first step deletes the data processor from the active group of the first link adapter. A second step re-directs datagrams intended for the data processor from the first link adapter to a storage device or network spooler.

In response to the data processor subsequently establishing a link with a second, new, link adapter a next step adds the data processor to the active group associated with the second link adapter. Further steps transmit stored datagrams in a First In/First Out order from the storage device to the second link adapter, receive the datagrams from the storage device; and send the received datagrams from the second link adapter to the data processor.

In response to the storage device transmitting all of the stored datagrams to the second link adapter the method includes the further steps of terminating the re-direction of datagrams from the first link adapter to the storage device and receiving, from the network with the second link adapter, further datagrams addressed to the data processor.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram of the base station of FIG. 1a;

FIG. 1c is a block diagram of the mobile unit of FIG. 1a;

FIG. 5 depicts a logic flow interaction between a migrating mobile unit and two base stations.

DETAILED DESCRIPTION OF THE INVENTION

Figure 1A:
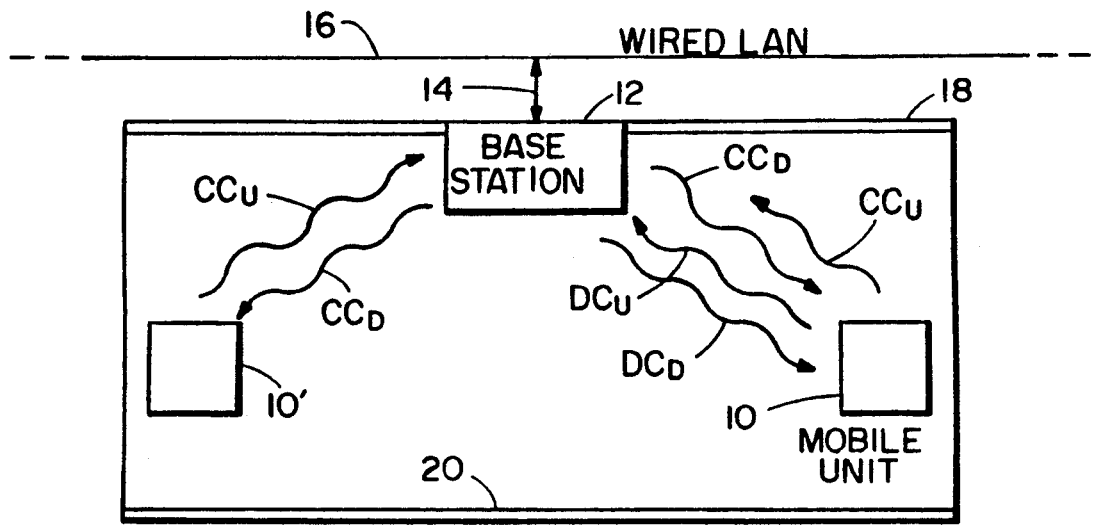
FIG. 1a is a block diagram showing a plurality of mobile units communicating with a base station.

FIG. 1a depicts an embodiment of the invention wherein a mobile data processing unit 10 is in bidirectional communication with a network link adapter, or base station 12, over an optical radiation communications channel. The base station 12 is coupled via a connector 14 to a wired local area network (LAN) 16. As shown the base station 12 is disposed within or adjacent to a ceiling 18 and the mobile unit 10 is carried or is otherwise transported over a floor 20. Of course, the mobile unit 10 may be used in a stationary manner if desired.

In accordance with a presently preferred communication technique communication between the mobile unit 10 and the base station 12 is accomplished through two discrete infrared optical channels. Specifically, there is provided a relatively low-bandwidth, for example 50 k Bits/s, command channel (CC) and a relatively higher-bandwidth, for example 1 M Bit/s or higher, data channel (DC). An uplink command channel ($CC_U$), uplink being from the mobile unit 10 to the base station 12, has a carrier frequency or wavelength that is offset from a downlink command channel ($CC_D$), downlink being from the base station 12 to the mobile unit 10, by an amount sufficient to prevent collisions between uplink and downlink command messages. Similarly, an uplink data channel ($DC_U$) has a carrier frequency or wavelength that is offset from a downlink data channel ($DC_D$) by an amount sufficient to prevent collisions between uplink and downlink data messages.

The communications channels are carried via an infrared (IR) data link having a preferred wavelength of approximately 1.4 microns, although presently available optical devices readily provide for operation within the range of approximately 750 nanometers to approximately 1000 nanometers. In accordance with the invention the command channel is carried by a diffuse transmission, relatively low bit-rate channel while the data channel is conveyed by a line-of-sight, relatively high bit-rate channel. This permits the control channel of a mobile unit 10, including one that is just coming within range of a base station 12, to establish communication with the base station 12 and also possibly through a network to a host system, before reliable communication becomes feasible on the higher frequency data channel. The result is the provision of a more reliable and more efficient infrared data communications network.

This presently preferred communication technique is disclosed in commonly assigned U.S. patent application Ser. No. 07/605,586, filed Oct. 29, 1990 entitled "Control Method for an Infrared Wireless Data Link", by C. Harrison et al.

Figure 1C:
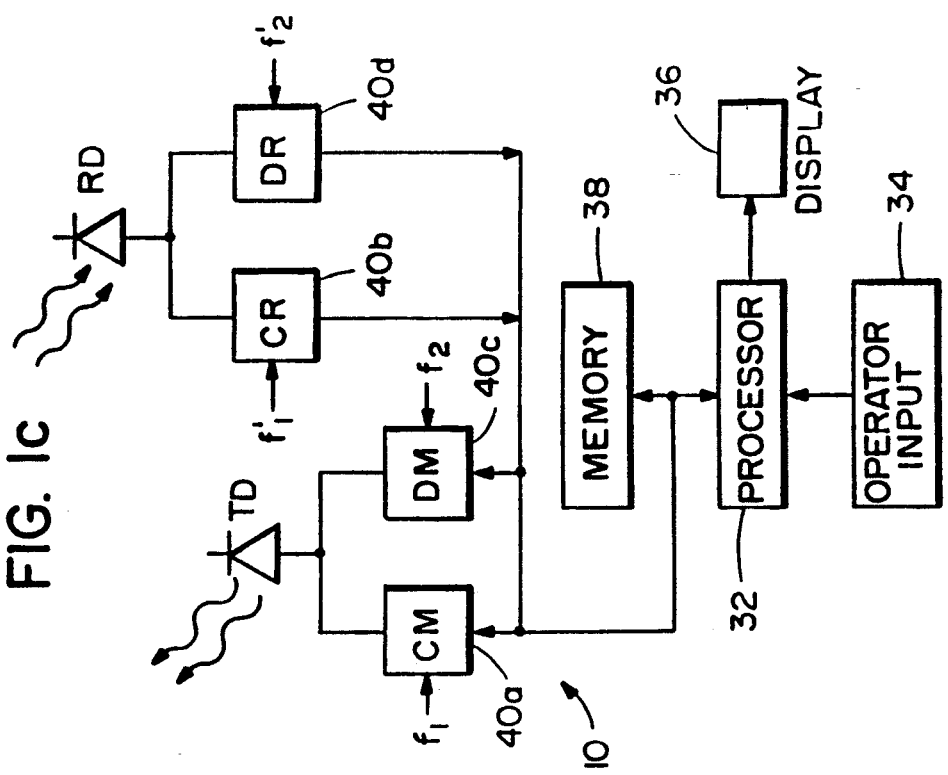
Figure 1B:
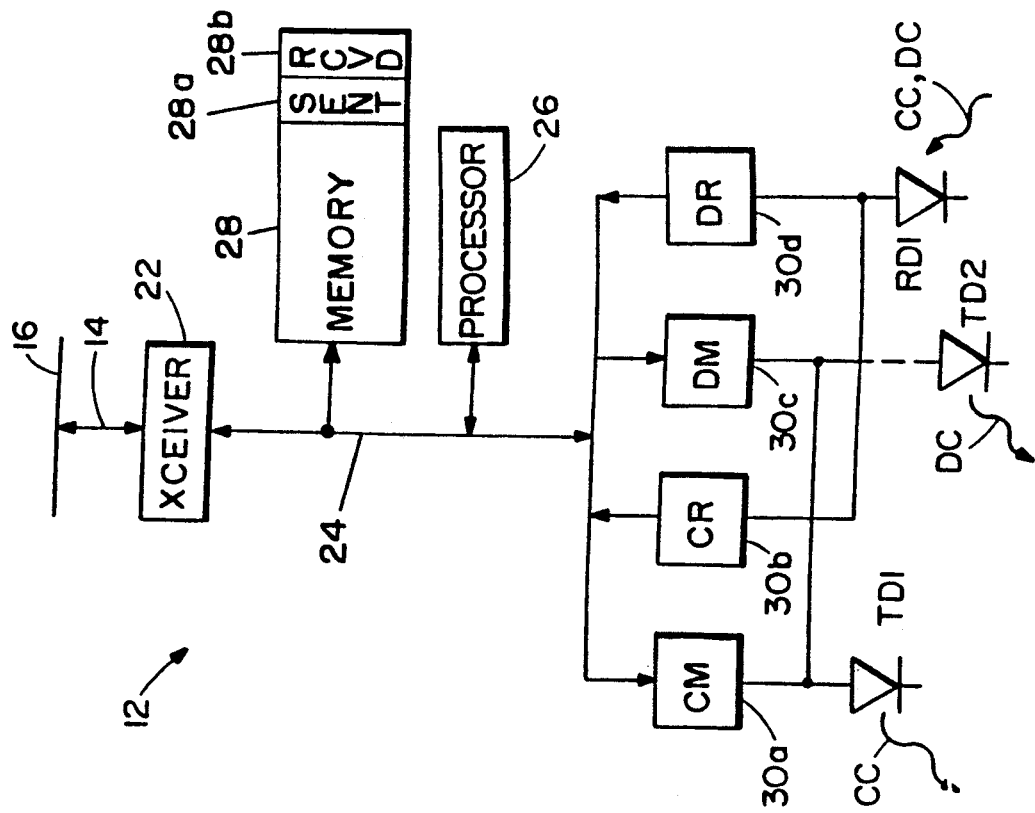

Referring to FIG. 1b there is shown a simplified block diagram of the base station 12. The base station 12 is coupled to the LAN 16 via the connector 14. Connector 14 is coupled to a network adapter transceiver 22 which in turn is coupled to an internal bus 24. The base station 12 includes a processor 26 that is bidirectionally coupled to a memory 28 that stores program-related and other data, including packets of data transmitted to or received from the mobile units 10. Processor 26 also communicates with a plurality of modulators and receivers, specifically a control modulator 30a, a control receiver 30b, a data modulator 30c and a data receiver 30d. These IR modulators and receivers have inputs coupled to suitable infrared emitting or receiving devices such as laser diodes, LEDs and photodetectors. In the illustrated embodiment the control modulator 30a and the data modulator 30c both have an output coupled to a transmit diode 1 (TD1). In an alternate embodiment the data modulator 30c is not coupled to the TD1 but is instead coupled to a second transmit diode (TD2).

Referring now to FIG. 1c there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the base station 12 and also an identification of the mobile unit 10. Also coupled to processor 32 are a plurality of command and data modulators and receivers 40a-40d. In FIG. 1c it can be seen that the command modulator 40a (uplink) is provided with a first frequency $f_1$ while the command receiver 40b (downlink) is provided with a second frequency $f_1'$ that is offset from $f_1$. Similarly, it can be seen that the data modulator 40c (uplink) is provided with a first frequency $f_2$ while the data receiver 40d (downlink) is provided with a second frequency $f_2'$ that is offset from $f_2$. The data receivers of FIGS. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream.

The wired LAN 16 may conform to any suitable network configuration. One suitable network protocol is known as TCP/IP, as described in detail in "Internetworking with TCP/IP Principles, Protocols, and Architectures" by Douglas E. Comer, Prentice Hall, N.J. 1988.

Figure 2:
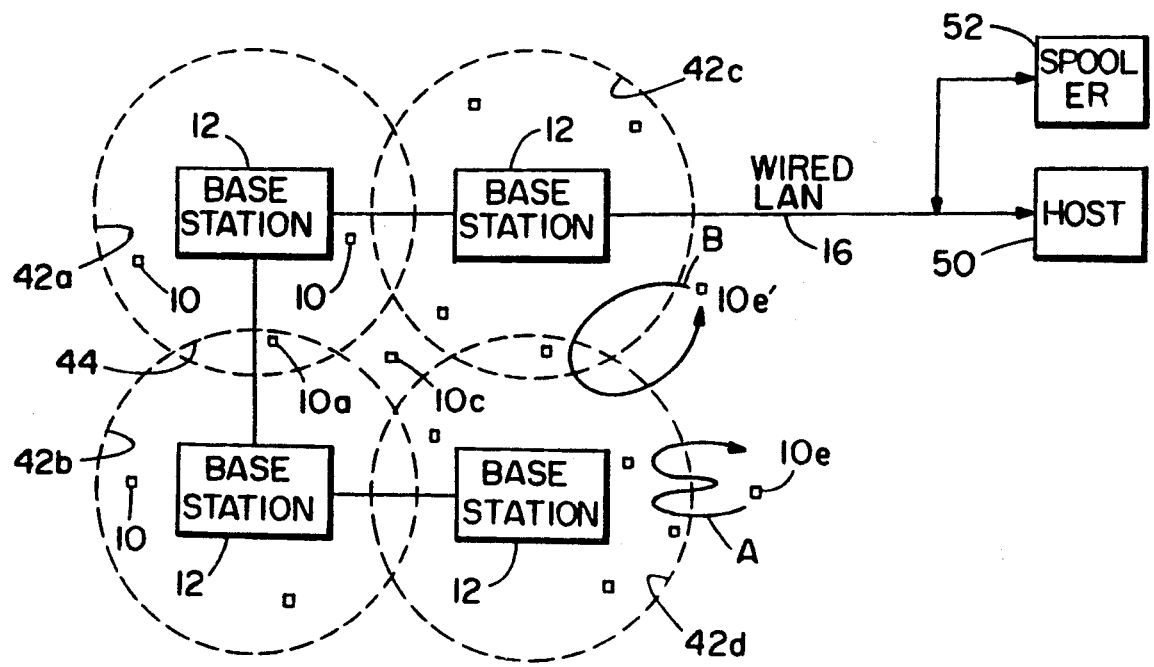
FIG. 2 shows a plurality of overlapping base station communication cells.

FIG. 2 illustrates a plurality of the base stations 12 each of which is coupled to a wired LAN 16 which in turn is coupled to a host data processing system 50. At least one mass data storage device, or spooler 52, is also coupled to the LAN 16 and is employed in a manner described in detail below. The base stations 12 are disposed such that substantially symmetrical optical fields (42a-42d) associated with each are overlapping. Thus, it can be seen that certain of the plurality of mobile units 10 are contained wholly within a single one of the fields while the mobile unit 10a is disposed within an overlapping region 44 between the fields 42a and 42b. The mobile unit 10c is disposed within a region not covered by any of the base stations 12. During use, the mobile units 10 can be expected to move about within a given region and to travel, or migrate, from one region to another. This is depicted by the mobile units 10e and 10e'. Mobile unit 10e can be seen to enter the region 42d along the path A and to subsequently exit, reenter and again exit the region. The mobile unit 10e' can be seen to follow the path B and to enter the region 42c, pass through an overlap region, pass into the region 42d and subsequently exit the coverage region. As can be appreciated, it is important to provide a handoff mechanism that permits the mobile units 10e and 10e' to establish contact with various ones of the base stations 12 while preserving an appearance of a constant connection to the LAN 16.

Figure 3:
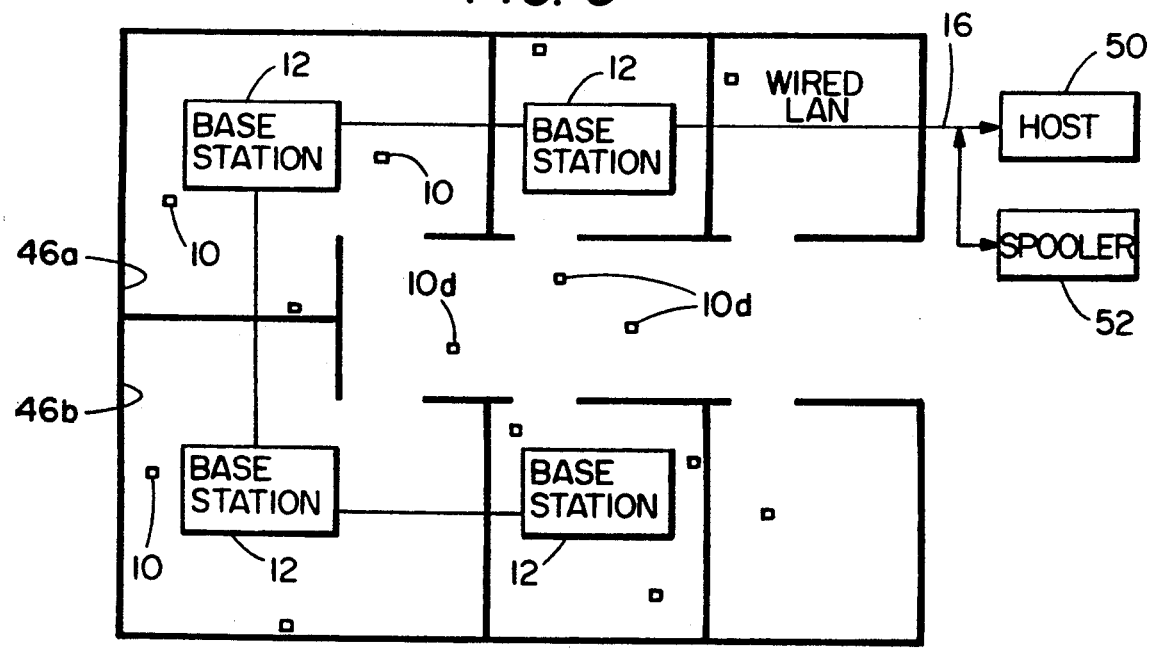
FIG. 3 shows a plurality of base stations disposed in separate rooms and not having overlapping coverage areas.

FIG. 3 illustrates another embodiment wherein the plurality of base stations 12 are each disposed within a separate cell or room (46a, 46b). In this embodiment there is no overlap between base station fields. So long as a mobile unit is within a room it is in communication with the associated base station 12. However, for those mobile units 10d which are illustrated to be within a hallway communication may be possible if properly aligned with a doorway or other opening into the enclosed area served by the base station 12.

Figure 4:
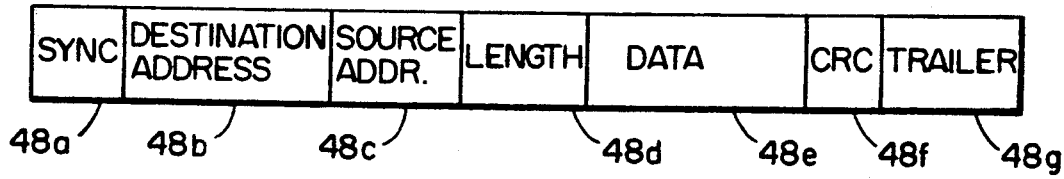
FIG. 4 shows one embodiment of a transmission packet that is suitable for communicating command and data information between the mobile units and a base station.

Communication is preferably achieved by Time Division Multiple Access (TDMA) technique wherein a plurality of slots make up a frame. The frames are repeatedly transmitted and a given mobil unit 10 is assigned one or more specific slots within which to transmit or receive information. FIG. 4 illustrates one suitable slot 48 format that is similar to that disclosed in the before mentioned commonly assigned U.S. Pat. No. 4,402,090. Specifically, a slot delimiter or synchronization (SYNC) field 48a is followed by a destination address field 48b and a source address field 48c. For an uplink message the destination address would be that of a base station 12 while the source address would be that of the transmitting mobile unit 10. In this regard each of the mobile units is assigned an identifier or address that typically corresponds to a network address. The mobile unit 10 addresses may be hardwired or otherwise preassigned. Preferably, the addresses are dynamically assigned when communication is established between the network and the mobile unit 10.

A next slot 48 field is a length field 48d which gives the length in bytes of the following data field 48e. For a command slot the data field will typically be substantially smaller than a data field 48e associated with a data slot. Following the data field 48e is a data integrity field, typically a CRC field 48f. A further slot delimiter is provided by a trailer field 48g. It should be realized that this format is exemplary only and that a number of suitable formats can be devised.

Each slot on the wireless link may be a re-packetized frame of the wired network protocol, for example, TCP/IP. The destination address field 48b is the address of the base station 12, possibly but not necessarily the base unit's IP address. The source address field 48c is either the base station 12 address (downlink) or the mobile unit 10 address (uplink), also possibly but not necessarily the mobile unit's IP address.

In the optical communication system of the invention all wireless communication is between the base station 12 and the mobile units 10. There is no direct communication between the mobile units 10. The slotted TDMA method is employed for transmission in each direction. Frames of slots 48 are passed to or from mobile units 10 which are allocated specific slots according to an arbitration scheme performed by the base station 12.

The mobile wireless network thus far described provides both media access control and data link control as indicated below.

Media access control relates to arbitration among the group of mobile units 10 for uplink access to the wireless medium of the infrared data link. Control requirements are asymmetric with respect to the uplink and the downlink channels. In the presently preferred embodiment the uplink and downlink are carried on separate optical wavelengths, thus avoiding collision.

The uplink control problem is relatively complex, since it is responsible for establishing the link when the mobile unit 10 first comes within range of the base station 12. Furthermore, media access control is required for this link.

Typical control events that are conveyed between the mobile unit 10 to the base station 12 upon the lower bandwidth $CC_U$ channel may include, but are not limited to, the following.

a) Establishment of connection with the base station 12, that is, becoming a member of the base station's mobile unit group.

b) Authentication of the mobile unit's identity.

c) Request for access to the medium, when the mobile unit 10 has one or more slots to transmit. This involves an arbitration performed by the base station 12 among those members of the associated mobile unit group having slots to transmit. These mobile units may also be referred to as "active members".

d) Deletion of access to the medium at the end of a transmission or if the mobile unit 10 "disappears" or disconnects.

e) Control of optical power or of data transmission rates to accommodate a close approach to the base station 12 by the mobile unit 10 or to permit lowered transmission rates when the signal path is shadowed. By example, it may be desirable to reduce transmitted power within a certain radius of the base station 12 in order to prevent overdriving the CR 30b.

f) Allocation of a slot 48 for the uplink data transmission.

g) Re-transmission of uplink slots found to have transmission errors.

h) A request that the mobile unit 10 temporarily suspend transmission.

i) A request that the mobile unit 10 discard any data that remains to be transmitted.

Of these various and exemplary control events the first (a) of establishing connection with the base station 12 is the most complex in that it requires the mobile unit 10 and the base station 12 to detect and acknowledge each other's presence.

In operation a mobile unit 10 seeking a base station 12 transmits a request for connection on the control channel by using maximum optical power. Since, in a presently preferred embodiment of the invention, the control channel is separate from the data channel this asynchronous transmission does not interfere with uplink data transmission that may be in process between the base station 12 and another mobile unit 10, although it may interfere with ongoing uplink control signals.

The access mechanism for the uplink control channel is preferably a simple ALOHA protocol of a type known in the art. This protocol permits asynchronous requests for connection by an approaching mobile unit 10 to be handled in the same manner as requests from the existing group members. To improve the "fairness" of the ALOHA access under near/far conditions, the mobile units 10 preferably have controllably variable power levels for the control signal transmission.

After the new mobile unit 10 is added to the base station 12 group the newly added member of the group is enabled to exchange control messages with the base station 12 using the uplink and downlink control channels.

In regard to downlink control events it is noted that there is no requirement for downlink media access control, since only the base station 12 uses the downlink channel, whereas the uplink channel must be shared by all of the mobile units within the associated group. It is assumed that the base station 12 avoids transmitting slots to mobile units that are not members of the associated group. That is, the base station 12 only transmits to mobile units 10 with which the base station 12 has an established link. For the downlink path therefore, the mobile unit 10 need only recognize slots 48 having the mobile unit's address within the field 48b.

Typical downlink control events that are conveyed from the base station 12 to the mobile unit 10 upon the $CC_D$ channel may include, but are not limited to, the following.

a) Notification of an intention to transmit to a specific mobile unit 10 (n) slots of information.

b) Notification of the end of the transmission.

Uplink responses to these control events from the mobile unit 10 to the base station 12 include the following.

a) Acknowledgement of the receipt of a slot.

b) A request for re-transmission of a slot.

c) A request for a temporary suspension of data transmission due to, for example, a buffer full condition.

d) A request for a more rapid transmission of slots. A base station 12 response to this uplink control event may be to allocate more time slots 48 within a frame to the requesting mobile unit 10.

e) A request for a less rapid transmission of slots. A base station 12 response to this uplink control event may be to allocate fewer time slots 48 within a frame to the requesting mobile unit 10.

The downlink control channel is broadcast to all mobile units within the group and the control slot 48 address field 48b enables only the addressed mobile unit(s) to identify their control messages. The downlink data channel is also broadcast to all mobile units within the group and the corresponding data slot 48 address field 48b enables only the addressed mobile unit(s) to identify their respective data packets.

The newly added mobile unit 10 synchronizes with the data link slot sequence by being assigned one slot number by the base station 12, via the control channel. Thereafter the mobile unit 10 is expected to internally keep track of slot numbers, although it can request to be assigned a slot any number of times. The uplink and downlink paths employ the same set of slot numbers. A mobile unit 10 which has been authorized to use the uplink path waits for the beginning of its authorized slot before sending data. A mobile unit 10 which has been instructed, via the control channel, to expect one or more packets of data from the downlink channel waits for the specified slot to occur and then begins to capture the information conveyed by that slot. A mobile unit can thus receive and transmit using a single assigned control or data slot.

The base station 12 buffers within the memory 28 data received from the wired network or from the uplink data channel. Data packets are transmitted in the order received within specified priority levels. The base station 12 refrains from transmitting except when it has data or control information to broadcast.

What follows now is a detailed description of a presently preferred handoff method for managing migration of the mobile units within the wireless network. It should be realized, although, that the handoff method of the invention is not limited for use in only a wireless network as described thus far. That is, there is no requirement that the units employ separate control and data channels, or that infrared radiation be employed to provide the communication medium. That is, the teaching of the invention is also applicable to systems employing radio frequency (RF) or other types of energy as a communication medium. Nor is any one specific network topology or network access method required to realize the teaching of the invention.

There are two circumstances in which a mobile unit 10 may lose contact with the base station 12 on which it is currently hosted.

A first circumstance is when the wireless link to the base station 12 is broken. The base station 12 eventually determines that it can no longer communicate to the mobile unit 10, typically by the expiration of a communication timeout.

In general, the base station 12 may have advance notice that the link will be broken and, in a worst case, discovers that the link is broken after some delay of, for example, one second. The base station 12 executes the following method, as depicted in FIG. 5, to preserve an illusion of continued connection to the LAN 16.

STEP A

The base station 12 deletes the mobile unit 10 from its active group, but continues to accept network datagrams for the mobile unit's address and, if the network protocol in use so requires, sends an acknowledgement back to the sender on behalf of the mobile unit 10.

STEP B

The received datagrams are not directed to the wireless network downlink, but are re-directed instead to the spooler 52. Spooler 52 is comprised of, by example, a network file server that includes a large file system and a database manager. The base station 12 sends the re-directed datagrams to a port of the database manager, which queues the diagrams in storage using the mobile unit's address as a key. The base station 12 also logs in a memory 28 file 28a datagram identifiers for each datagram sent to the spooler 52.

STEP C

After some period of time the mobile unit 10 re-establishes connection to a base station 12, possibly the original base station, and the (new) base station 12 adds the mobile unit 10 to its active group, but does not yet notify the LAN 16 and begin to receive network datagrams for the mobile unit 10.

STEP D

The new base station 12 queries the mobile unit 10 over the wireless link to determine the identification of the original base station 12 that the mobile unit 10 was previously connected to. Also, in a multi-spooler LAN embodiment, the mobile unit 10 may be queried to determine which spooler the original base station 12 was expected to use. The new base station 12 may also query, over the LAN 16, the original base station 12 to determine which spooler 52 was used to log the datagrams.

STEP E

The new base station 12 then queries the spooler 52, over the LAN 16, for any datagrams that the spooler 52 may have stored for the mobile unit just added to the active group. Spooler 52 begins the transfer, over the LAN 16, of stored datagrams to the new base station 12 in First In/First Out (FIFO) order. This transfer takes place from the spooler 52 to a LAN address owned permanently by the new base station 12 and then from the new base station 12 to the mobile unit 10 over the wireless link.

It is noted that during this time the mobile unit 10 still appears, to the LAN 16, to be attached to the original base station 12. This condition remains in effect until the spooling process is completed and the original base station 12 completes the handoff. This illusion of continued connectivity to the original base station 12 is maintained to avoid multiple interrupted handoffs. Thus, if the handoff is interrupted while the retrieval is in progress, the retrieval process can resume at the same or another base station 12, as described in greater detail below.

As each datagram is transferred to the mobile unit 10, via the new base station 12, the datagram is deleted from the spooler 52 queue and added to a received log 28b in the new base station 12. It is noted that the old base station 12 may continue to re-direct datagrams to the spooler 52 during this retrieval period, thereby adding entries to its associated sent log 28a.

STEP F

After the spooler 52 is emptied, and in the case of path A in FIG. 2 where the original base station is the same as the new base station, datagrams are no longer directed to the spooler 52. By comparing the sent log 28a with the received log 28d the base station determines if it has retrieved all datagrams from the spooler 52. In the case of missing datagrams spooler 52 is queried for datagrams placed into the queue after it was first emptied. When all datagrams are accounted for base station 12 deletes the two logs 28a and 28b.

STEP G

Figure 6:
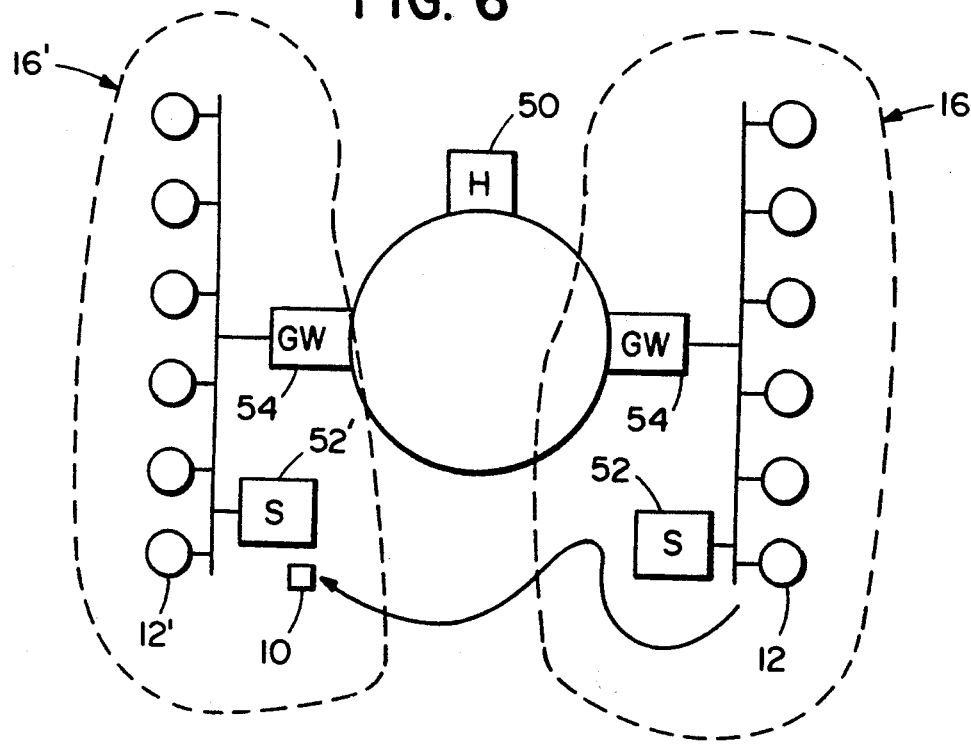
FIG. 6 is a schematic diagram of a logical LAN having two distinct physical LANs coupled together by a gateway.

Referring to FIG. 6, if the original base station 12 is not identical to the new base station 12 (path B of FIG. 2) and/or if the mobile unit 10e has crossed from one physical LAN 16 to another physical LAN 16', the new base station 12' informs a bridge or gateway 54, if one is implemented, of the mobile units' new location. The new base station 12' begins to receive network datagrams for the mobile unit 10 and sends a message over the LAN 16 to the original base station 12 requesting it to suspend re-direction of datagrams to the spooler 52 and to send a copy of the sent log 28a. The original base station 12 deletes the sent log 28a after sending it, thus completing its handoff. By comparing the sent log 28a received from the previous base station 12 with the associated received log 28b, the new base station 12 determines if it has retrieved all datagrams from the spooler 52. In the case of missing datagrams spooler 52 is queried for datagrams placed into the queue after it was first emptied. Duplicate datagrams, which are received by both the old and the new base stations 12 and sent to the spool 52 queue by the old base station 12, are also detected and eliminated. When all datagrams are accounted for the new base station 12 deletes the two logs 28a and 28b.

It should be noted that the only missing datagrams to be recovered during handoff are any that are lost during the changeover from re-direction by the original base station 12 to reception by the new base station 12'. These datagrams may have been sent to the spooler 52 after the new base station 12' believes it has emptied the queue. Messages lost in the network (missing frame numbers) are detected when the base station 12 performing re-direction receives, or fails to receive, the datagram from the network as part of a basic transport layer protocol. Thus, the original sequence of datagrams is preserved and there is no requirement for a sender to buffer an entire sequence in order to ensure that all are eventually received by a target mobile unit.

A critical step in the method is the suspension of re-direction at the old base station 12. When this step is completed (STEPS F or G), the original base station 12 has successfully handed off the mobile unit 10 and is no longer involved. However, the handoff process does not occur until the new base station 12' has completed transfer of datagrams from the spooler 52. If the mobile unit 10 again loses contact before the original base station 12 has completed its handoff, the original base station 12 continues to perform re-direction while the new base station 12' has simply served to retrieve a portion of the queued datagrams from the spooler 52. In this case the new base station 12' notifies the original base station 12 to delete from its sent log 28a those datagrams that were successfully delivered to the mobile unit 10 by the new base station 12'. Eventually the mobile unit 10 makes contact with another "new" base station 12 and the retrieval process is restarted. In that the order of the datagrams is preserved in the retrieval process the retrieval process may be interrupted at will without a loss of data or datagram order. The mobile unit 10 can be expected to eventually remain in contact with a base station 12 for an amount of time sufficient to complete the datagram retrieval process and complete the handoff.

If the spool server 52 is a separate system on the LAN 16 the method requires that each datagram is transmitted three times over the LAN: once from the original sender, once to the spooler 52 and once from the spooler 52. This network traffic may be avoided if each base station 12 also incorporates a file system. However, there are practical objections to the additional complexities required for such an implementation.

The additional network traffic is approximately proportional to a ratio of the time the mobile unit 10 is disconnected from the network to a total session time for communication with the remote sender. If the network bandwidth is sufficiently high, and if the rate of mobile unit migration is also high, in some modes of usage direct datagram transfer rarely occurs. For this case most datagrams are transferred in brief bursts of retrieval from the spooler 52. This may be considered to be a "normal" mode of operation for an intermittent wireless network, such as might occur in the case of mobile robots or transportation systems incorporating base stations 12 alongside highways or railway tracks.

As was previously stated the handoff method of the invention is not limited for use in only a wireless network as described. Also, there is no requirement that the units employ separate control and data channels, or that infrared radiation be employed to provide the communication medium. Nor is any one specific network topology or network protocol or access method required to realize the teaching of the invention. Furthermore, certain steps or substeps of the method may be combined or accomplished in a different order while still achieving substantially the same result.

Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method for providing an appearance of a continual connection of a data processor means to a wired network of the type having a plurality of wireless link adapter means each of which bidirectionally passes data to and from the network over a wireless link, the data being transmitted to or received from data processor means having means for coupling to the wireless link, comprising the steps of:

in response to the data processor means breaking the wireless link with a first link adapter means of the plurality of wireless link adapter means,
re-directing to network storage means, with the first link adapter means, any data received from the network that is intended for the data processor means;

in response to the data processor means establishing a link with a second link adapter means of the plurality of wireless link adapter means,
transmitting stored data from the network storage means to the second link adapter means;
receiving with the second link adapter means the data from the storage means; and
sending the received data from the second link adapter means to the data processing means;

in response to the network storage means transmitting all of the stored data to the second link adapter means,
terminating the re-direction of data from the first link adapter means to the storage means; and
receiving from the network, with the second link adapter means, any further data addressed to the data processing means.

2. A method as set forth in claim 1 wherein, in response to the data processor means breaking the wireless link with the first link adapter means and then reestablishing the wireless link with the first link adapter means, the method includes the steps of:
transmitting stored data from the network storage means to the first link adapter means;
receiving with the first link adapter means the data transmitted from the storage means; and
sending the received data from the first link adapter means to the data processing means.

3. A method as set forth in claim 1 wherein the step of redirecting includes a step of maintaining, with the first link adapter means, a first record for identifying the data re-directed to the storage means.

4. A method as set forth in claim 3 wherein the step of receiving the data from the storage means includes a step of maintaining, with the second link adapter means, a second record for identifying the data received from the storage means.

5. A method as set forth in claim 4 wherein the step of terminating includes a step of transmitting the first record from the first link adapter means to the second link adapter means, and wherein the method includes a further step of comparing the received first record to the second record to determine if all stored data has been received from the storage means.

6. A method as set forth in claim 1 wherein the step of sending includes a step of transmitting the data with an infrared radiation medium.

7. A method as set forth in claim 1 wherein the step of sending includes a step of transmitting the data with a radio frequency medium.

8. A method for providing an appearance of a continual connection of a data processor means to a wired network of the type having a plurality of wireless link adapter means, individual ones of the plurality of link adapter means directing data from the wired network over a wireless link to one or more data processor means belonging to an associated active group of data processor means, where a data processor means is enabled, at any given time, to be a member of only one active group that is associated with one of said plurality of link adapter means, comprising the steps of:
in response to the data processor means breaking the wireless link with a first link adapter means, the data processor means being a member of the active group of the first link adapter means, deleting the data processor means from the active group of the first link adapter means; and re-directing data, that is intended for the data processor means, from the first link adapter means over the wired network to a storage means selected from one or more storage means that are coupled to the wired network;

in response to the data processor means establishing a link with a second link adapter means, adding the data processor means to the active group associated with the second link adapter means;

transmitting stored data in a First In/First Out order from the storage means to the second link adapter means;

receiving the data from the storage means; and sending the received data from the second link adapter means to the data processing means;

in response to the storage means transmitting all of the stored data to the second link adapter means, terminating the re-direction of data from the first link adapter means to the storage means; and receiving, from the network, further data addressed to the data processing means, the further data being received with the second link adapter means.

9. A method as set forth in claim 8 wherein the step of adding the data processing means to the active group includes a step of:

interrogating the data processing means to determine an identity of the first link adapter means.

10. A method as set forth in claim 8 wherein the step of redirecting includes a step of maintaining a first log that identifies the data re-directed to the storage means.

11. A method as set forth in claim 10 wherein the step of receiving the data from the storage means includes a step of maintaining a second log that identifies the data received from the storage means.

12. A method as set forth in claim 11 wherein the step of terminating includes a step of transmitting, over the wired network, the first log from the first link adapter means to the second link adapter means, and wherein the method includes a further step of comparing the received first log to the second log to ensure that all stored data has been received from the storage means.

13. A method as set forth in claim 8 wherein the step of receiving the data addressed to the data processing means with the second link adapter means includes an initial step of informing a network bridge means that the second link adapter means is associated with a second network.

14. A method as set forth in claim 8 wherein the step of sending includes a step of transmitting the data with an infrared radiation medium.

15. A method as set forth in claim 8 wherein the step of sending includes a step of transmitting the data with a radio frequency medium.

16. A method as set forth in claim 9 wherein the step of interrogating the data processing means includes a step of transmitting information over a first infrared radiation link having a first bandwidth, wherein the step of sending the received data from the second link adapter means to the data processing means includes a step of transmitting data over a second infrared radiation link having a second bandwidth, and wherein the first bandwidth is less than the second bandwidth.

17. Apparatus for providing an appearance of a continual connection of a data processor means to a wired network of the type having a plurality of wireless link adapter means each of which bidirectionally passes data to and from the network over a wireless link, the data being transmitted to or received from data processor means having means for coupling to the wireless link, comprising:

data storage means bidirectionally coupled to the network;

means, responsive to the data processor means breaking the wireless link with a first link adapter means of the plurality of link adapter means, for re-directing to the data storage means any data received from the network that is intended for the data processor means;

means, responsive to the data processor means establishing a link with a second link adapter means of the plurality of link adapter means, for initiating the transmission of stored data from the data storage means to the second link adapter means;

means for receiving the data from the data storage means; and means for sending, over the wireless link, the received data from the second link adapter means to the data processing means.

18. Apparatus as set forth in claim 17 and further comprising means, responsive to the data storage means transmitting all of the stored data to the stored link adapter means, for terminating the re-direction of data from the first link adapter means to the data storage means, the second link adapter means further including means for receiving from the network any further data addressed to the data processing means.

19. Apparatus as set forth in claim 17 wherein each of the link adapter means and the data processing means include means for transmitting and for receiving control information over a first infrared radiation link having a first bandwidth, and means for transmitting and receiving the data over a second infrared radiation link having a second bandwidth, and wherein the second bandwidth is greater than the first bandwidth.

20. A method as set forth in claim 9 wherein the step of adding the data processing means to the active group includes a step of:

interrogating the identified first link adapter means with the second link adapter means to determine an identity of the storage means to which the data is being redirected by the first link adapter means.

* * * * *